United States Patent [19]

Propst

[11] 4,354,539
[45] Oct. 19, 1982

[54] SYSTEM FOR PULPWOOD HARVESTING AND DELIVERY

[76] Inventor: Robert L. Propst, 4141 145 Ave. NE., Bellevue, Wash. 98007

[21] Appl. No.: 191,947

[22] Filed: Sep. 29, 1980

[51] Int. Cl.³ ............................................. A01G 23/08
[52] U.S. Cl. ................................... 144/338; 104/118; 104/124; 144/3 D
[58] Field of Search ....................... 104/118, 124, 125; 144/3 D, 309 AC

[56] References Cited

U.S. PATENT DOCUMENTS

| | | | |
|---|---|---|---|
| 345,645 | 7/1886 | Multon | 104/124 |
| 3,491,810 | 1/1970 | Williams | 144/309 AC |
| 3,911,982 | 10/1975 | Ervin et al. | 144/309 AC |
| 4,273,168 | 6/1981 | Propst | 144/390 AC |

Primary Examiner—W. D. Bray
Attorney, Agent, or Firm—Olsen and Stephenson

[57] ABSTRACT

A pulpwood harvesting system for cutting and transporting trees upon a fragile terrain so as to have a dispersed and minimal impact on the terrain. A rail network is supported above the surface of the terrain upon spaced vertical pilings. Trees are cut and reduced to bulk by a mobile tree harvester and transported to the rail network by a mobile forwarder. The tree harvester and forwarder move upon tracks or other means to disperse their weight. The rail network is progressively installed by a mobile rail layer supported upon previously installed rails. Automated lorries receive the bulk pulpwood and transport it upon the rail network to a distant unloading site.

21 Claims, 14 Drawing Figures

SYSTEM FOR PULPWOOD HARVESTING AND DELIVERY

BACKGROUND OF THE INVENTION

1. Field of the Invention

The present invention relates to tree harvesting and, more particularly, to a system for cutting and transporting pulpwood trees upon a fragile terrain so as to have a dispersed and minimal impact on the terrain.

2. Description of the Prior Art

In the usual harvesting of pulpwood, selected trees are cut from the ground, loaded as full-length logs onto conventional trucks, and transported over roads to a pulp mill for processing. Generally, several persons are required on the ground to operate chain-type power saws for cutting the trees, wheeled loading vehicles are maneuvered over the ground to drag the trees across the ground and load the cut trees onto the trucks, and the trucks are driven over rudimentary roads at the site where the trees are harvested until reaching public roads. Additionally, storing, sorting, and partial processing of the trees may take place at the harvesting site, requiring additional contact with the ground by operating personnel, wheeled vehicles, and cut trees.

However, in many remote areas which produce trees usable as pulpwood, the ground is not suitable for these conventional methods. For example, in much of Canada and some parts of the United States, the ground surface consists of a layer of peat of variable thickness over a sublayer of clay. As a result, during much of the year, the ground surface becomes a black muck making travel and storage difficult and making the fragile vegetation and soil vulnerable to tramping feet or rotating wheels of heavy vehicles. Since the prior art does not suggest an acceptable way to harvest pulpwood upon such a ground surface, those pulpwood producing areas having such ground conditions are not being regularly and economically harvested.

SUMMARY OF THE INVENTION

The present invention is an apparatus and method of pulpwood harvesting and delivery especially suitable for cutting and transporting trees upon a fragile terrain. The invention features handling of the pulpwood in bulk rather than as individual full-length logs and utilizes rail delivery means and special-purpose vehicles.

The pulpwood harvesting and delivery system includes a rail network having at least two parallel rails supported above the surface of the ground upon spaced vertical pilings. The trees are cut and reduced to bulk-handleable pieces by a mobile tree-harvester and are transported to the rail network by a mobile forwarder. The tree-harvester and forwarder are movable upon tracks or other means which disperse their weight over a large area of the ground. The rail network is progressively installed by a mobile rail-layer which is supported upon a previously installed section of the rail network. A number of lorries receive the pieces of pulpwood from the forwarder and transport those pieces upon the rail network to a distant unloading site. The pulpwood pieces are unloaded either at one or more truck terminals or at a sloping storage yard adjacent a pulp mill. A mobile yard rake unpiles and rakes the earliest stored pulpwood from the storage yard onto a conveyor which carries the pulpwood into the pulp mill.

The pulpwood harvesting system of the present invention has many advantages over conventional harvesting techniques. The trees are quickly reduced to pieces which are small enough to permit handling and transportation by simple, fast, reliable, mechanical systems in bulk. Most of the delivery cycle is accomplished *above* the ground. The few harvesting steps which require contact with the ground are accomplished with minimum ground disturbance. Harvested wood is kept off the ground, and only an absolute minimum of persons is required on the ground. The system can continue to operate independently of single equipment failures and adverse weather conditions. The rail transport cycle can be automated and self-regulating, requiring no operators and little supervision. And, primary materials for constructing the rail network roadbed can be obtained directly from the immediate woodlands.

As a result of the present invention, harvesting and delivery of pulpwood can be completed economically with almost no damage to the in-place nursery capability of the soil. A large area can be harvested progressively to minimize capital expenditures by reinstalling rails and salvaging pilings after retrieving them from already harvested areas. The system is flexible and uncomplicated, permitting harvesting program changes and requiring few technicians or specialists. The workforce can be transported to the field in a fast, comfortable manner over the rail network using conventional highway vehicles. All the pulpwood which is cut at a particular time arrives at the pulp mill simultaneously and promptly to ensure uniformity of the pulpwood product processed by the pulp mill. Also, the system utilizes a high commonality of basic components for straightforward maintenance and for efficient stocking of spare equipment and parts.

Further objects, features, and advantages of this invention will become apparent from a consideration of the following description, the appended claims, and the accompanying drawings.

DESCRIPTION OF THE PREFERRED EMBODIMENT

Figure 1:
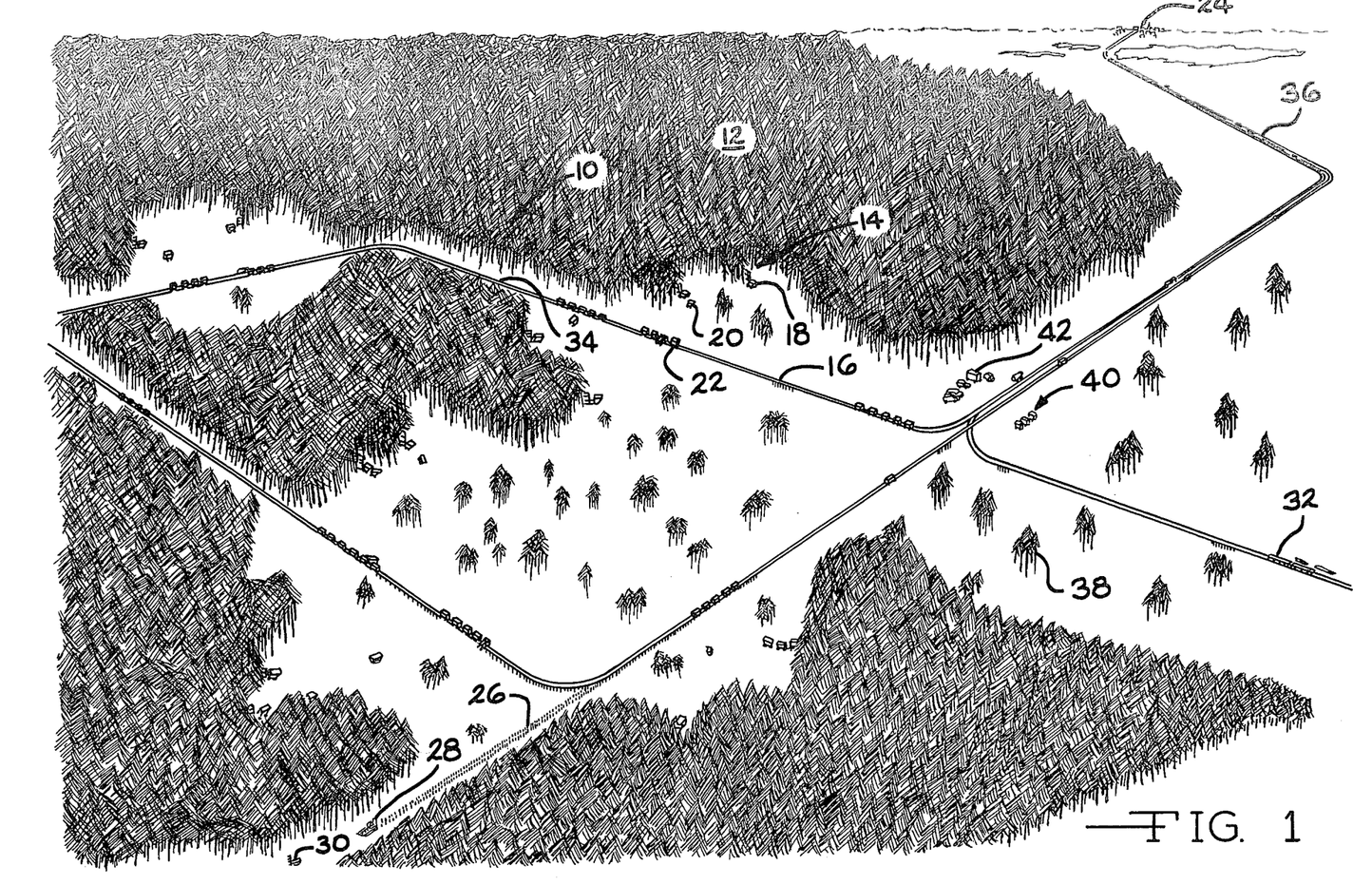
FIG. 1 is a perspective view of the pulpwood harvesting and delivery system of this invention showing a partially harvested wooded area.

With reference to the drawing, the pulpwood harvesting system of the invention, indicated generally at 10, is illustrated in FIG. 1 in relation to a wooded area 12 having pulpwood trees. The pulpwood harvesting system has several harvesting sites, indicated generally at 14, positioned in proximity to a rail network, indicated generally at 16. Self-propelled mobile tree harvesters 18 at each harvesting site cut the trees from the stump, remove the limbs from the trunks of the trees, cut the trunks into four-foot or eight-foot bolts, and load those bolts onto self-propelled mobile forwarders 20. The forwarders 20 load the bolts onto lorries 22 for transit over the rail network 16 to a distant unloading site 24.

The rail network 16 is supported upon regularly spaced vertical pilings 26 installed by a self-propelled mobile pile driver 28, shown preparing a new section of roadbed for the rail network 16. A self-propelled mobile piling harvester 30 cuts selected trees from the stump, removes the limbs from the trees, cuts the trees to piling length leaving a wedge point at the top, and transfers those piles to the pile driver 28. Both the piling harvester 30 and the pile driver 28 move upon tracks rather than road wheels to disperse the weight of the vehicles over a large surface area of the ground. The pilings are installed point first such that the larger stump end protrudes above the ground so as to increase friction between the pilings and the ground and provide a broader base for mounting the rail network 16.

A self-propelled mobile rail layer 32 follows the pile driver 28, laying segments of track to progressively extend the rail network 16 on the pilings 26. The rail layer 32 has a pair of swinging booms supporting an I-beam crane to advance sections of rail to positions to either side ahead of the rail layer 32. The swinging booms are of sufficient length to permit laying of an adjacent track upon an adjacent piling run. Since the rail layer 32 rides along the rail network 16, the weight of the rail layer 32 is carried by the pilings 26 rather than the surface of the ground.

Normally, the rail network is constructed with two tracks, one woods-bound and the other mill-bound, parallel and within 10 feet of each other. However, applicant has found that large areas of pulpwood can be efficiently harvested by the use of temporary rectangular loops 34 connected to more permanent railway sections 36. After a section of the wooded area 12 is harvested by clear cutting or by leaving clumps of trees for reforestation and wildlife habitat purposes as shown at 38, the rails of temporary track loops 34 are lifted by the rail layer 32 and the pilings are extracted by the mobile pile driver 28. The rails are installed in new harvesting loops, and the pilings are salvaged for pulpwood or for wood chips. Pilings for the more permanent railway section 36 can be of a selected non-pulp species and can be dipped in a preservative.

The lorries 22 are self-propelled and remotely controllable for unattended movement along the rail network 16. In addition, the lorries 22 have a steering mechanism and can be manually driven off the rail network 16 in areas in which the ground is firm or built up to form a crossway stand such as that indicated generally at 40. This off-road movement of the lorries 22 permits random management of the lorries without railyards or sidings. conventional highway vehicles 42 are adapted for travel upon the rail network 16 by the addition of flanged guide wheels engageable with the rails and are used for rapidly transporting people, materials, and equipment to the field.

Figures 2, 4, 5:
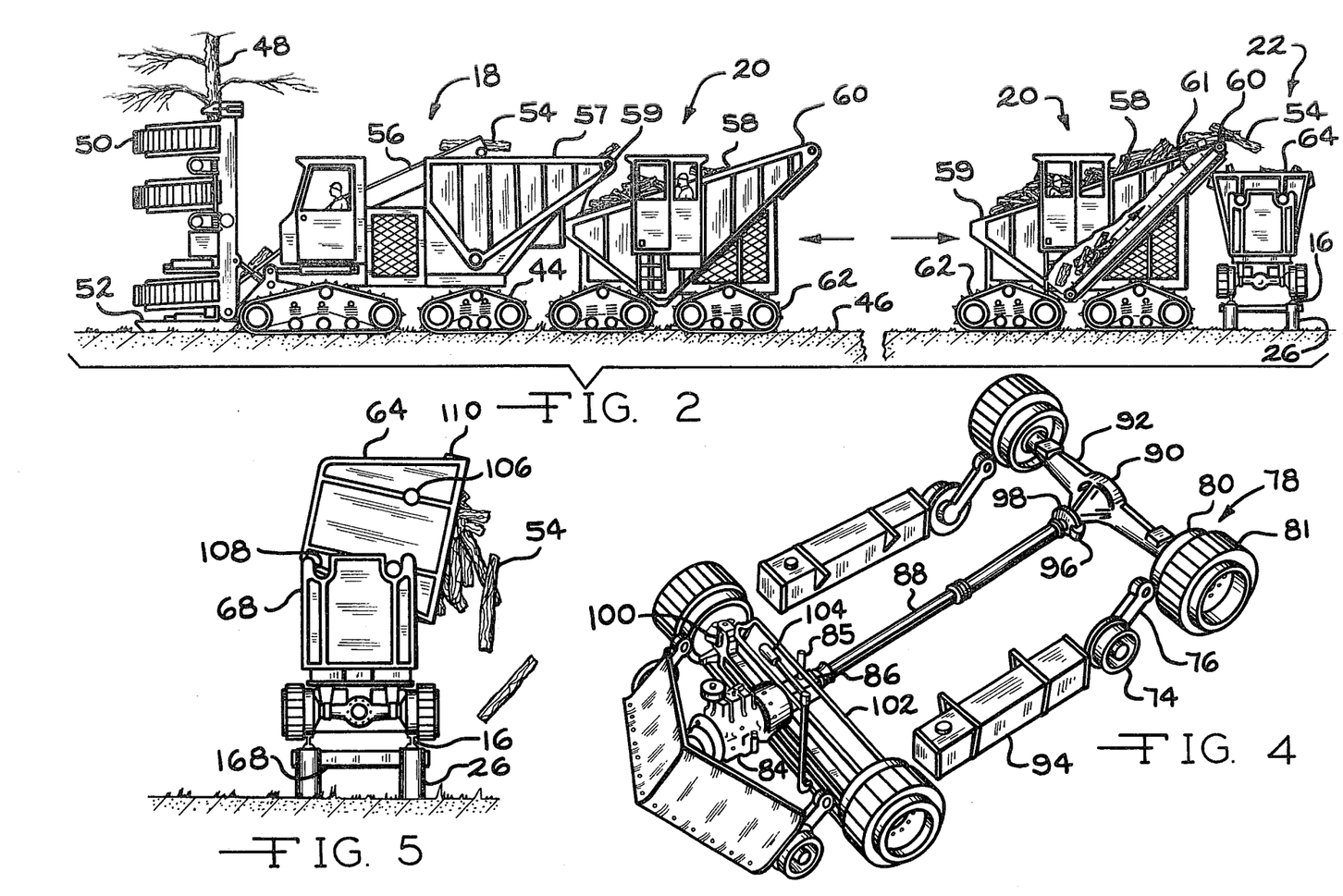
FIG. 2 is a side elevational view of a tree harvester harvesting a tree and discharging its load into a forwarder and, at the right, a side elevational view of the forwarder discharging its load into a lorry.
FIG. 4 is a perspective view of the drive means and steering means of a lorry.
FIG. 5 is an end elevational view of a lorry discharging its load.

The details of the tree harvester 18 are disclosed in my copending United States Patent Application Ser. No. 078,649, filed Sept. 24, 1979, now U.S. Pat. No. 4,273,168, and those details are incorporated herein by reference. The tree harvester 18 rides along tracks 44 as shown in FIG. 2 for dispersing the weight of the harvester over a large surface area of the ground 46. A pulpwood tree 48 is gripped by rollers 50 and is cut from the stump at 52 while the tree harvester 18 continues to move forward. The tree harvester 18 holds the tree vertically and lowers the tree down, delimbing the tree and cutting the trunk into four-foor or eight-foot bolts 54 which are fed up a conveyor 56 to a storage bin 58. The rollers 50 can pick up and cut a second tree, not shown, while down-processing tree 48 into pulpwood bolts.

The forwarder 20 receives the bolts 54 which have accumulated in the storage bin 57 of the tree harvester 18. A discharging conveyor, not shown, moves along the sloping bottom of storage bin 57 to transport the bolts 54 upward and rearward out of the storage bin 57 and into a storage bin 58 of the mobile forwarder 20. The forwarder storage bin 58 has a low end 59 positionable below the terminus of the discharging conveyor of the tree harvester 18 to allow the bolts 54 to drop into the storage bin 48 and has a high end 60 positionable above the lorry 22 to facilitate discharging of the bolts 54 into the lorry 22. From those two extremities, the end walls of the storage bin 58 converge downwardly to form a V-shaped hopper. A chain-driven conveyor 61 moves along the sloping bottom of the storage bin 58 to transport the bolts 54 from the low point of the V-shaped hopper to the high end 60 of the storage bin 58.

The forwarder 20 moves upon tracks 62 to disperse the weight of the forwarder over a large surface area of the ground 46. The forwarder 20 moves forward and rearward between the tree harvester 18 and the lorry 22 as a double-ended vehicle as shown by the arrows in FIG. 2. This double-ended feature allows the forwarder 20 to complete a round trip without turning so as to minimize maneuvering and ground disturbance. The bolts 54 are unloaded from the mobile forwarder 20 into a hopper 64 of the lorry 22 by means of the conveyor 61. In FIG. 2, the lorry 22 is shown during loading in its normal, elevated position upon the rail network 16 which is supported upon vertical pilings 26.

Figure 3:
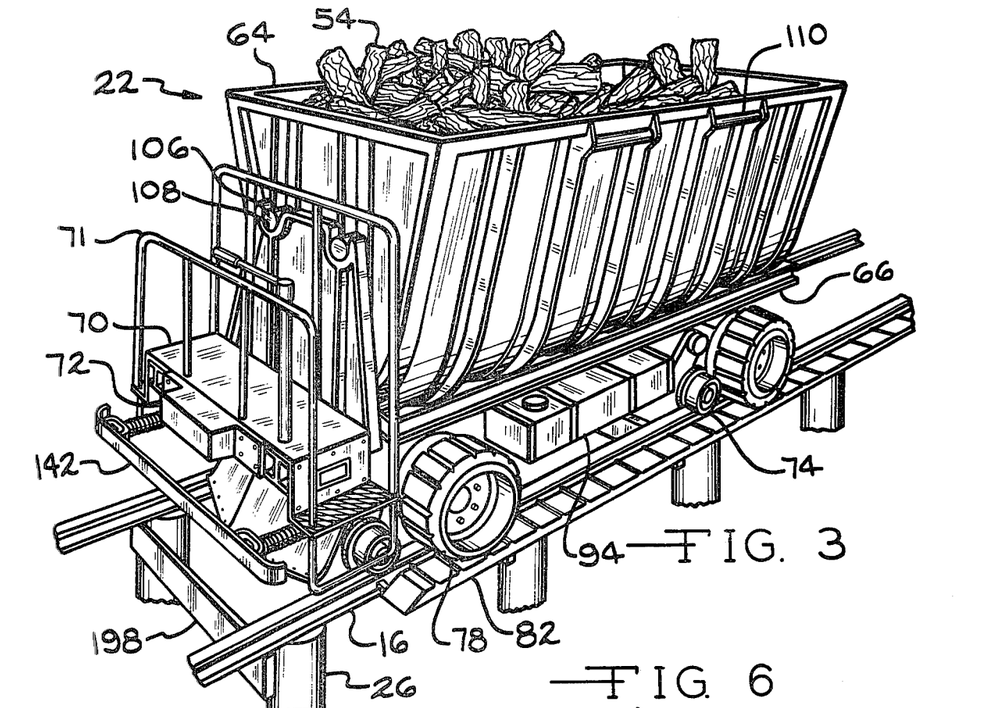
FIG. 3 is a perspective view of a lorry positioned upon the rail network.

The lorry 22 has a conventional perimeter frame 66 with diagonal support members, not shown. Two transverse vertical pivot frames 68 are mounted on top of the frame 66 adjacent the ends thereof as shown in FIG. 3. An operator platform 70 having a protective railing 71 is adjacent one end of the frame 66. A shock bumper 72 extends from each end of the frame 66 and may include a shock absorbing piston, not shown, incorporated within the frame 66. Applicant has found that the shock bumper 72 can permit a lorry operating at normal road speed to safely collide with a stationary lorry to push the disabled lorry along the rail network 16 and thereby prevent a shutdown of the system.

As shown in FIG. 4, the lorry 22 has four guide wheels 74 which are pivotally mounted on the frame 66 by pivot arms 76 for up and down movement to selectively engage the rail network 16. Four support wheels, indicated generally at 78, one adjacent each of the four corners of the lorry, are connected to the frame 66 by a conventional-type suspension, not shown. The support wheels 78 include inwardly extending flanges 80 for engagement with the rail network 16 and outwardly extending solid rubber tires 81 with large crosswise grooves forming a tread. The treads of the tires 81 are engageable with cogged side rails 82 fastened to the rails of the rail network 16 to effect an auxiliary cog drive to increase grade climbing ability of the lorry 22.

A diesel engine 84 is air-cooled and drives the rearward pair of support wheels 78 through a torque converter 85, a transmission 86, a drive shaft 88, a differential 90, and a rear axle 92. Fuel is supplied from a fuel tank 94 mounted along each side of the frame 66, and braking is applied by a brake caliper 96 mounted on the differential 90 for engaging a rotating disk 98 mounted on the drive shaft 88. The front support wheels are pivotally mounted on king pins 100 and are connected by a drag link 102 for coordinated movement by tiller 104, operable by an operator on the operator platform 70 for steered movement of the lorry 22 during off-rail operation.

The hopper 64 of the lorry 22 has four cylindrical pivot rods 106 having longitudinal axes, one pivot rod adjacent each corner of the hopper 64, which engage pivot seats 108 in the pivot frame 68 for stable support of the hopper 64 above the frame 66 when the hopper 64 is not being unloaded. Longitudinal bars 110 are mounted at the upper edge of the hopper 64 adjacent each side thereof to serve as hooks and permit pivotal engagement of the hopper 64 by a dumping crane, described below. In response to an upward and inward force applied by the dumping crane to the bars 110 along one side of the hopper 64, the hopper 64 pivots at the pair of pivot rods 106 at the side of the hopper opposite the lifting force so as to dump the bolts 54 to a side of the rail network 16 as shown in FIG. 5.

Figure 6:
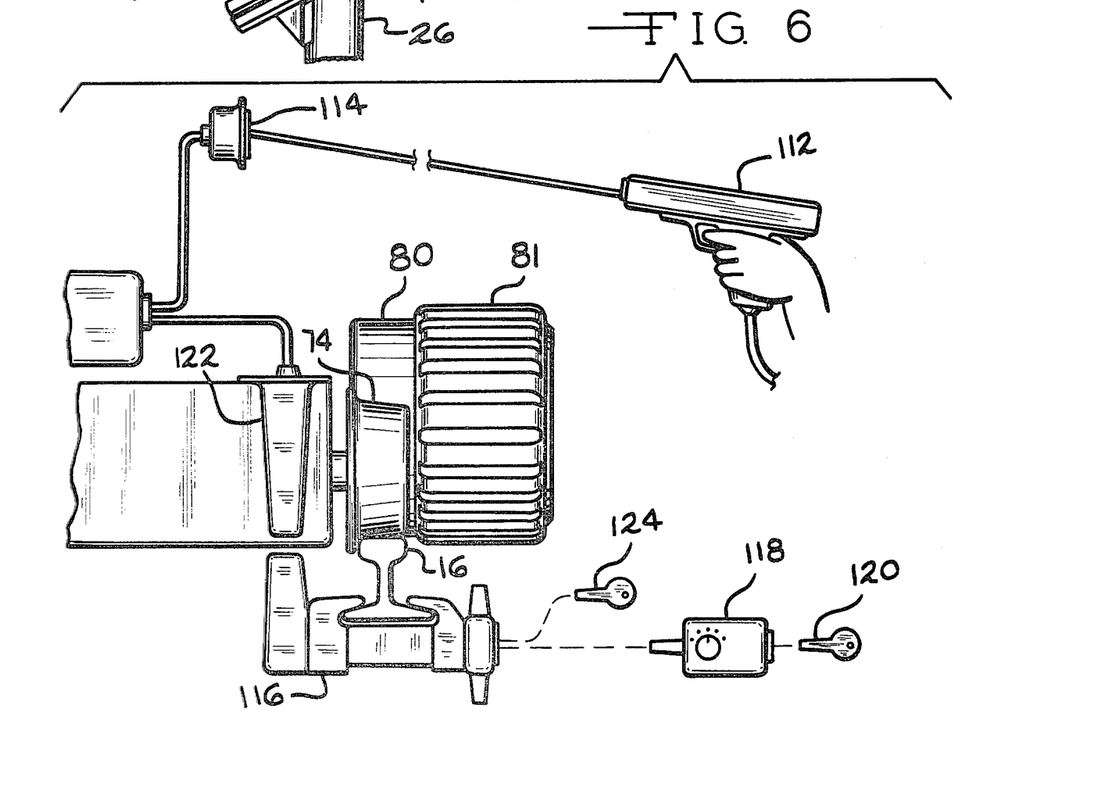
FIG. 6 is an end elevational view of a selected part of the control system of a lorry.

To ensure that lorry movements are initiated only by authorized personnel, the lorry 22 is started by a signal from a master-key controlled laser gun 112, shown in FIG. 6, or by a master-key control, not shown, on the lorry's platform 70. The signal of the laser gun 112 is received by a pick-up head 114 located on the side of the lorry 22 and signals the lorry to start up in low gear. Other similar master-key controls are provided upon the tree harvester 18, forwarder 20, pile driver 28, piling harvester 30, and rail layer 38 to ensure that movement of those vehicles is initiated only by authorized personnel.

Figures 7, 8, 10:
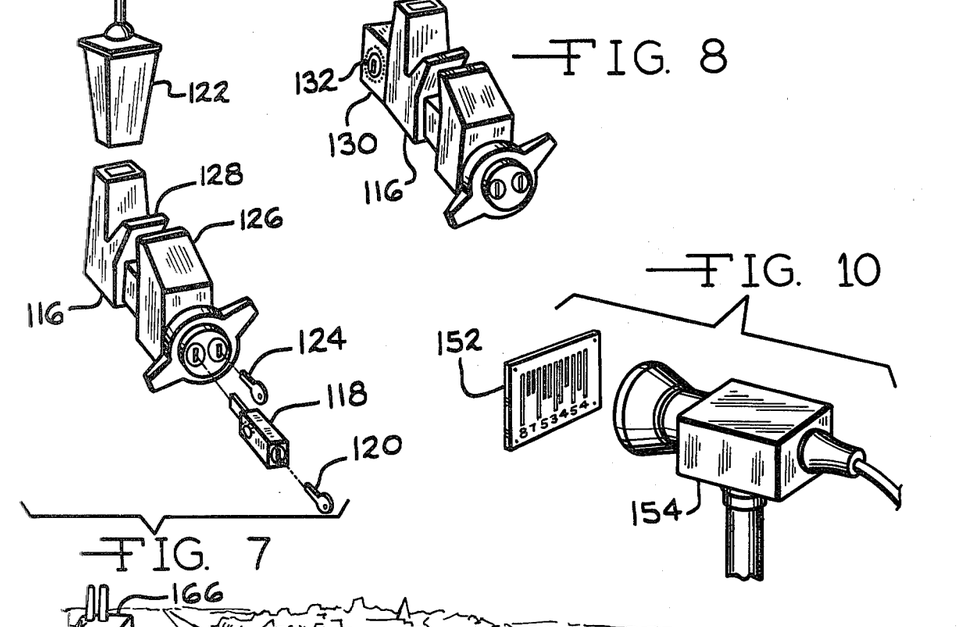
FIG. 7 is a perspective view of a rail-mounted proximity signal generator showing the locking device of the signal generator and a lorry-mounted proximity signal pick-up head.
FIG. 8 is a perspective view of a rail-mounted proximity signal generator which permits a preselected number of lorries to pass before offering a signal to a passing lorry.
FIG. 10 is a perspective view of a coded bar display of a lorry in position with a laser reader.

A rail-mounted proximity signal generator 116 can be set by a double master-key 118 and 120 to signal the lorry to change speed-low to high and high to low-or to signal the lorry to stop. A proximity signal pick-up head 122 is mounted on the lorry in alignment with the signal generator 116 to receive the signals. The signal generator 116 is locked onto a rail network 16 by a separate key 124 and jaws 126 and 128, as shown in FIG. 7, to prevent unauthorized removal of the signal generator. As shown in FIG. 8, a delay device 130 is added to selected signal generators 116 which can be set by keyed slot 132 to offer no signal until a predetermined number of lorries have passed. This delay device is used in the harvesting loops 34 to autospot groups of lorries near harvesting sites of several points in the loop.

Figure 9:
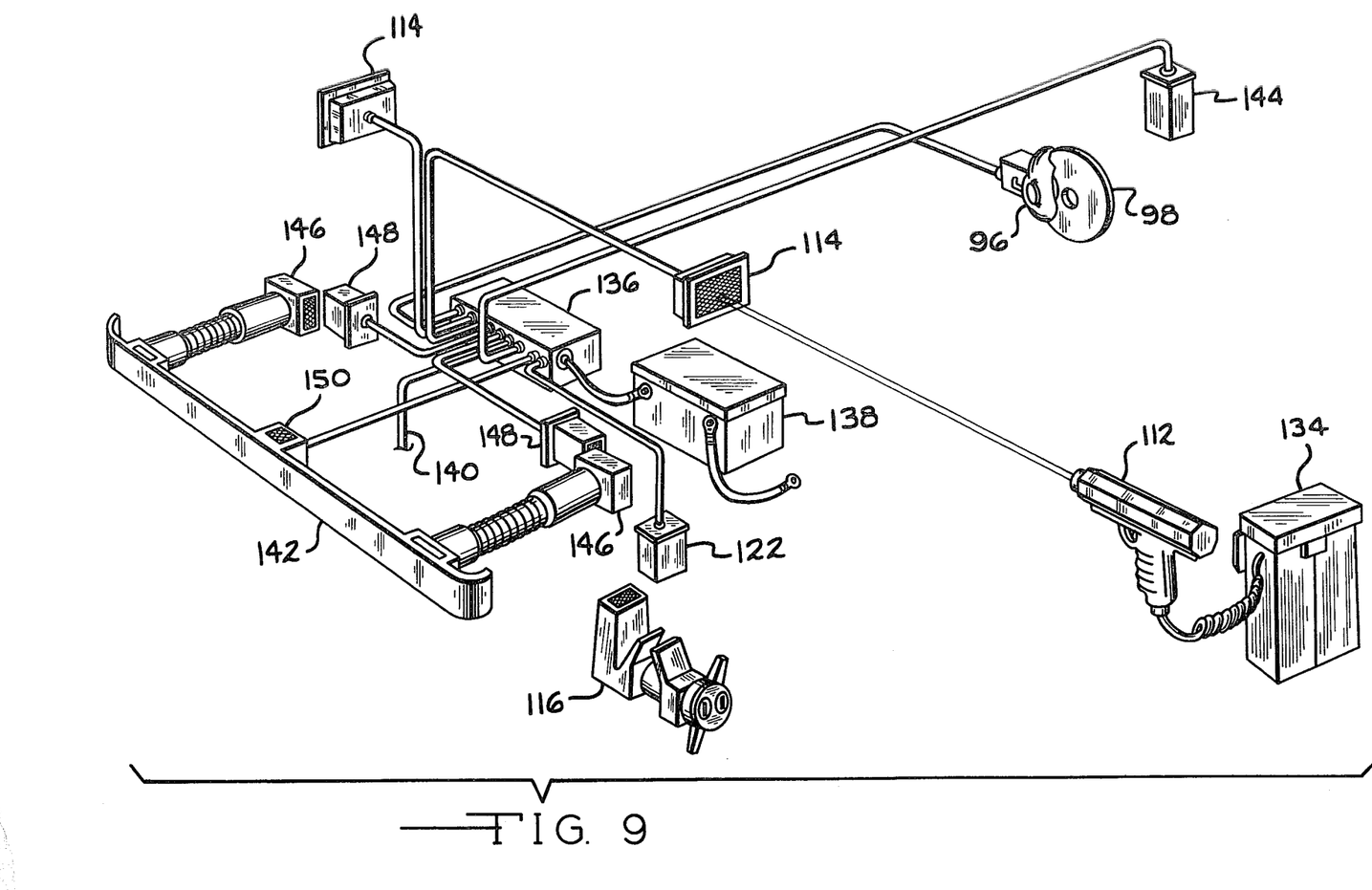
FIG. 9 is a perspective view of the control system of a lorry.

The automatic control devices of the lorry 22 are shown pictorially in FIG. 9. A battery pack 134 is used in conjunction with the laser gun 112 to provide portability of the laser gun 112. The laser signal of the laser gun 112 is received by the laser beam pick-up head 114 and transmitted to a control box 136 which controls power from a battery 138 to selectively shift the transmission 86 connected at 140. The proximity signal pick-up head 122 is similarly connected to the transmission 86 and also to the brake caliper 96 through the control box 136 and the battery 138.

The lorry 22 is equipped with an obstruction bumper 142 which, when impacted, transmits a signal to disengage the transmission 86, apply the brake caliper 96, and set a rear proximity signal device 144 to signal a following lorry to also disengage the transmission, apply the brake, and set the rear proximity device. An impact by the obstruction bumper 142 is detected by a proximity signal switch 146 and 148, and the signal from the rear proximity signal device 144 is detected by a front proximity signal device 150 positioned upon a following lorry. A coded bar display plate 152 as shown in FIG. 10 can be mounted on the side of each car for identification by a laser reading device 154 to permit automatic sorting of each lorry 22 and to assist in maintaining proper service intervals.

Figure 11:
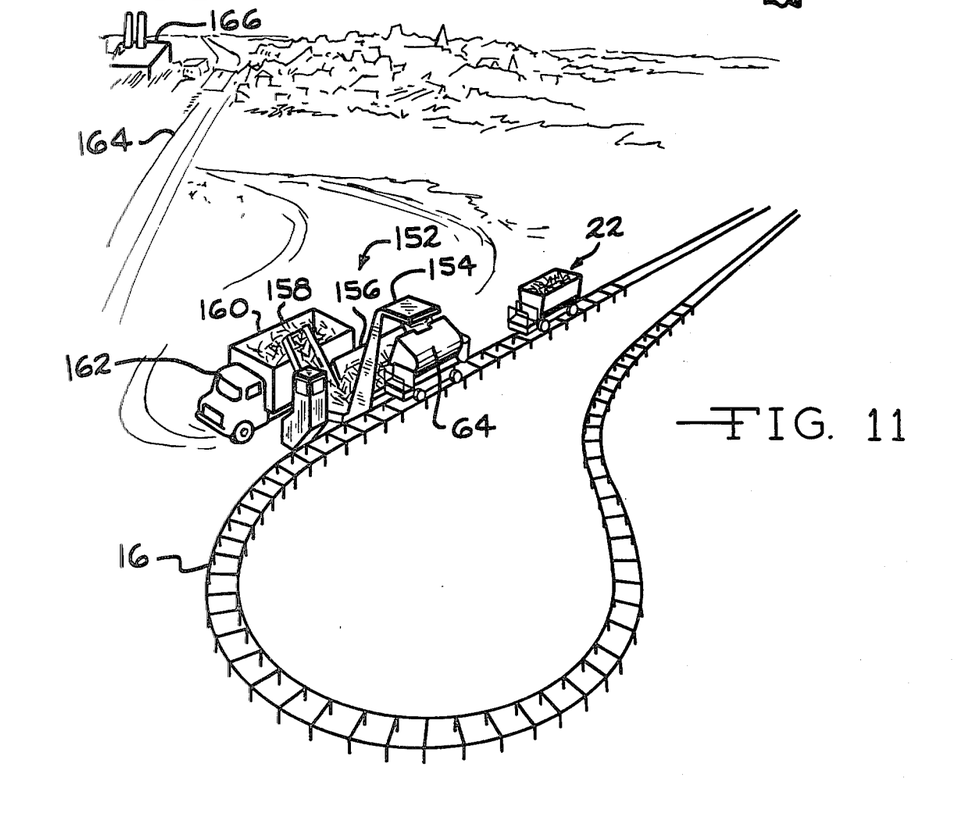
FIG. 11 is a perspective view of an unloading site receiving bolts of pulpwood from a lorry and loading bolts of pulpwood onto a conventional truck.

The lorries are unloaded either at pulpwood mills, not shown, adjacent the rail network 16 or at truck terminals as shown in FIG. 11. The truck terminal, generally indicated at 152, includes a crane 154 to grip the hopper 64 of the lorry 22 at the bars 110 and pivot the hopper 64 to dump the bolts 54 into a hopper 156. The hopper 156 has downwardly converging side walls to feed the bolts 54 onto a conveyor 158 which transfers the bolts 54 upward and drops them into the bed 160 of a conventional open-top dump truck 162. The pulpwood is then carried by the truck 162 over conventional highways 164 to a distant mill 166.

Figure 12:
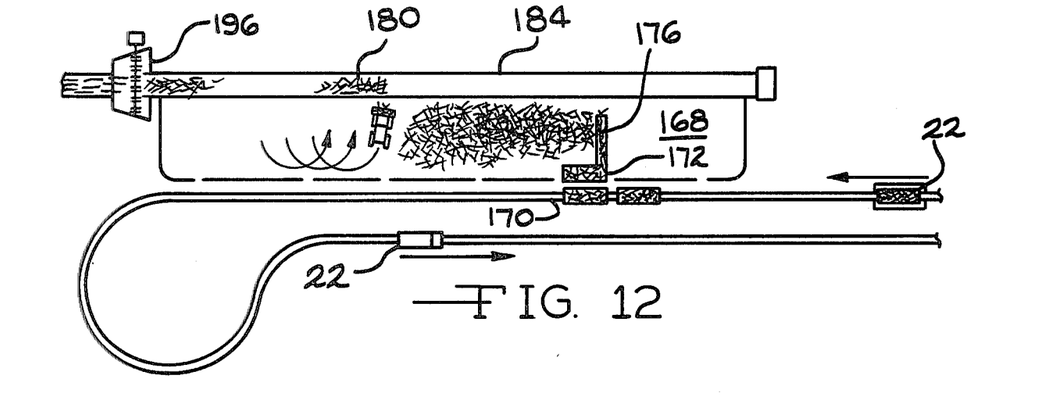
FIG. 12 is a plan view of a slope yard where lorries are unloaded adjacent a pulp mill.
Figure 13:
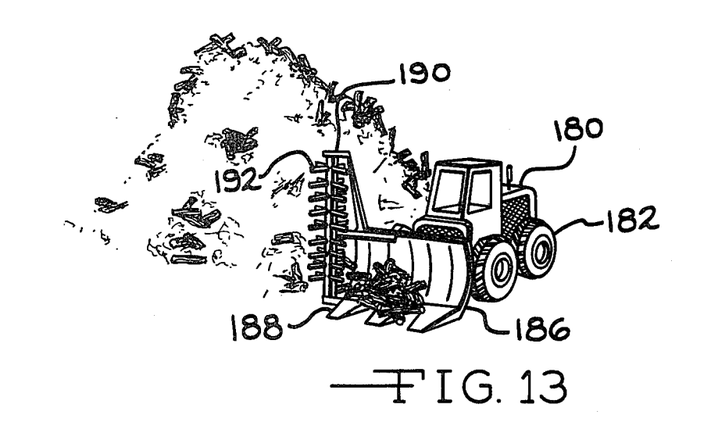
FIG. 13 is a perspective view of a yard rake shown in relation to a pile of bolts of pulpwood at a slope yard.
Figure 14:
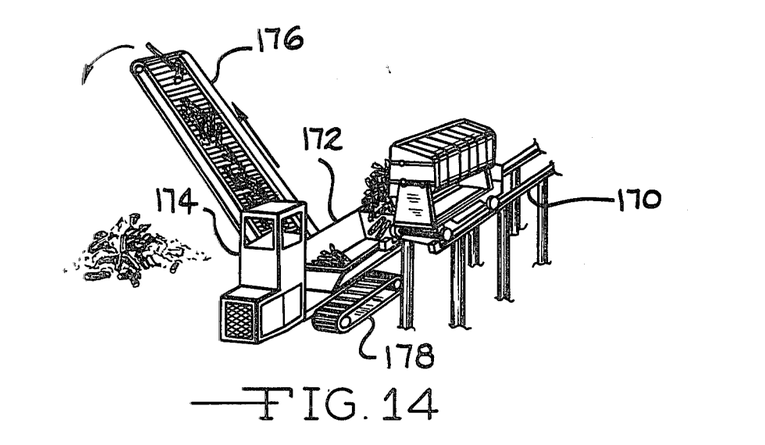
FIG. 14 is a perspective view of an unloader-stacker receiving bolts of pulpwood from a lorry.

Alternatively, the lorries 22 are unloaded at a generally rectangular slope yard 168 adjacent a pulp mill as shown in FIGS. 12–14. A crane, not shown, similar to crane 154 dumps the lorry 22 from a specially elevated portion 170 of the rail network 16 into a hopper 172 of a mobile unloader-stacker 174. The hopper 172 has downwardly converging side walls which feed the bolts onto a conveyor 176 which transports the bolts upward and away from the rail network 16 the where the pulpwood is discharged to form a pile. The unloader-stacker 174 moves parallel to the rail network 16 by means of tracks 178 to form a continuous stack of bolts on the slope yard 168 adjacent the rail network 16. When the unloader-stacker 174 reaches the end of the slope yard 168, the unloader-stacker returns to the opposite end to begin a new stack.

A mobile yard rake 180 moves on large rubber tires 182 to push the bolts across the slope yard 168 onto a conveyor 184 which carries the bolts into the pulp mill, not shown. The yard rake 180 has a vertical plow-like blade 186 and multiple horizontal fork-like blades 188 to engage the bolts. A depiler 190 with multiple horizontal arms 192 rotates about a vertical axis at one end of the plow-like blade 186 to grasp stacked bolts, pull them from the stack, and direct them into the path of the blades 186 and 188. The yard rake 180 moves forward and rearward along arcuate paths 194 and progresses in the same direction as the unloader-stacker 174 so as to move the earliest stored pulpwood to the conveyor 184. A conveyor bolt dresser 196 has counter-rotating arms which continuously cast crosswise bolts back and to the side where they tend to roll back down aligned with the conveyor 184.

In one particular application of the preferred embodiment, the diesel engine 84 of the lorry 22 is a 35 horsepower air-cooled unit and the transmission 86 of the lorry 22 is an electromechanically changed two-speed transmission geared for operation of the lorry 22 at a road speed of 25 mph or a yard speed of 5 mph. The fuel tanks 94 give each lorry 22 a capacity of 100 gallons to permit continuous operation over a three-day period. Additional special purpose lorries are used to transport persons, materials, and equipment and to serve as field offices. These special purpose lorries are as bolt carrying lorries described except for the substitution of a flatbed with special purpose equipment for the hopper 64 and the transverse pivot frames 68.

In the specific application just described, 24,000 cords of pulpwood can be harvested in a year by 26 mobile harvesters 18 having ¾ cord accumulation capacity, 40 mobile forwarders 20 having 1½ cord capacity, and 450 lorries having a capacity of 3 cords. The 2,000-foot maximum traverse of the forwarders 20 allows an area of 1,500 acres to be harvested with a single square harvesting loop. Cross braces 198 are added to pilings 26 every 5 or 10 feet to prevent spreading of the individual rails of the rail network 16. The pilings 26 are 20 feet in length and are leveled with a chain saw at approximately three feet above the ground just before the rails are spiked thereto. Additional shorter piles are added in groups around primary piles to stabilize the pilings 26 as necessary.

From the above description, it can be seen that this pulpwood harvesting system is especially suited to cutting and transporting pulpwood trees upon a fragile terrain. Harvested wood is efficiently handled and transported in bulk without contact with the ground. The system can continue to operate independently of single equipment failures and adverse weather conditions. The high commonality of basic components facilitates stocking of spare equipment and parts and simplifies maintenance. Pilings and tracks or other weight dispersing means minimize disturbance of the terrain. The system is flexible and is not limited to the particular preferred embodiment described herein.

While the preferred embodiment of the present invention has been described in considerable detail, the present invention is not to be limited to such detail except as may be necessitated by the appended claims.

What is claimed is:

1. A pulpwood harvesting system for cutting and transporting trees upon a fragile terrain so as to have a dispersed and minimal impact on the terrain, comprising:

a plurality of spaced vertical pilings inserted into the terrain so as to protrude above the terrain, said pilings arranged along a predetermined route extending from at least one harvesting site to at least one unloading site;

a rail network consisting of rail segments mounted on said pilings so as to form a continuous railway having at least two parallel rails supported by said pilings above the terrain over said predetermined route;

mobile rail-laying means for progressively installing said rail network by installing said rail segments upon said pilings while the weight of said rail-laying means is supported upon others of said rail segments previously installed;

mobile tree harvesting means for cutting said trees adjacent to the surface of said terrain and for reducing said trees to bulk-handleable pieces while dispersing the weight of said harvesting means over a large surface of the terrain;

mobile forwarding means for receiving said bulk-handleable pieces from said harvester means and transporting said pieces to said rail network while dispersing the weight of said forwarding means over a large surface of the terrain; and a plurality of lorries rollable upon said rail network for receiving said bulk-handleable pieces from said forwarding means and for transporting said pieces from said harvesting site to said unloading site.

2. A pulpwood harvesting system as defined in claim 1 wherein said tree harvesting means and said forwarding means are self-propelled, tracked vehicles, said vehicles having tracks in place of road wheels so as to permit movement of said vehicles while dispersing the weight of said vehicles over a large surface of the terrain.

3. A pulpwood harvesting system as defined in claim 1 wherein said rail-laying means is operable to remove said rail segments from said pilings, while the weight of said rail-laying means is supported upon others of said rail segments, so as to salvage used rail segments when a portion of said railway is no longer required, as when one said harvesting site has been completely harvested.

4. A pulpwood harvesting system as defined in claim 1 which further comprises supplemental vehicles rollable upon said rail network for transporting people, materials, or equipment over said rail network or for use as field offices.

5. A pulpwood harvesting system as defined in claim 1 which further comprises conventional rubber-tired highway-driveable vehicles equipped with rail guide means, so as to be operable on said rail network, for transporting people, materials, or equipment over said rail network.

6. A pulpwood harvesting system as defined in claim 1 which further comprises mobile piling harvester means for cutting selected ones of said trees adjacent the surface of said terrain and for delimbing and pointing said trees while dispersing the weight of said piling harvester means over a large surface of the terrain so as to form said pilings in proximity to said rail network without external raw materials.

7. A pulpwood harvesting system as defined in claim 6 wherein said piling harvester means includes tracks in place of road wheels so as to permit movement while dispersing the weight of said piling harvester means over a large surface of the terrain;

holding means for temporarily holding a quantity of said formed pilings; and unloading means for unloading said formed pilings onto said mobile pile-driving means.

8. A pulpwood harvesting system as defined in claim 1 wherein at least one said unloading site is a terminal comprising receiving means for receiving said bulk-handleable pieces from said lorries and loading means for loading said bulk-handleable pieces onto conventional rubber-tired highway-driveable trucks for transport to a distant pulp mill.

9. A pulpwood harvesting system as defined in claim 1 wherein at least one said unloading site is adjacent to a mill yard.

10. A pulpwood harvesting system as defined in claim 1 wherein said lorries are self-propelled and are capable of manual off-rail operation so as to allow random management of said lorries without rail yards or sidings.

11. A pulpwood harvesting system as defined in claim 10 which further comprises at least one crossway stand including a small raised area adjacent said rail network so as to permit said lorries to enter and exit said crossway stand and temporarily stand off said rail network.

12. A pulpwood harvesting system as defined in claim 1 wherein said rail network includes cogged side rail means and wherein said lorries include at least one grooved drive wheel engageable with said cogged side rail means so as to increase grade climbing ability of said lorries by increasing traction between said lorries and said rail network.

13. A pulpwood harvesting system as defined in claim 1 wherein said lorries include impact absorbing means for cushioning impact between a stationary first lorry and a moving second lorry so as to permit said first lorry to be pushed along said rail network by said second lorry, said impact absorbing means resiliently deforming during impact between said first and second lorries to prevent damage thereto.

14. A pulpwood harvesting system as defined in claim 1 wherein said lorries include control means for controlling the movements of said lorries upon said rail network other than by controls which require an operator upon said lorries.

15. A pulpwood harvesting system as defined in claim 14 wherein said control means includes rail-mounted signal means attached to said rail network at selected locations thereof to signal said lorries to change speeds and stop when said lorries are in proximity to said rail-mounted signal means.

16. A pulpwood harvesting system as defined in claim 15 wherein said rail-mounted signal means offers no signal until a preselected number of lorries have passed said rail-mounted signal means.

17. A pulpwood harvesting system as defined in claim 14 wherein said control means includes a portable laser for remotely signalling selected ones of said lorries to start.

18. A pulpwood harvesting system as defined in claim 14 wherein at least one of said lorries includes predetermined display means and wherein said pulpwood harvesting system further includes a laser reading means for reading said display means so as to permit automatic sorting and switching of said lorries.

19. A pulpwood harvesting system as defined in claim 1 wherein said lorries include dumping means for dumping said bulk-handleable pieces to either side of said rail network.

20. A pulpwood harvesting system as defined in claim 1 which further comprises security means including locking means having double master keys for locking smaller elements of said pulpwood harvesting system to said rail network and for immobilizing other elements of said pulpwood harvesting system so as to prevent unauthorized use thereof.

21. A method for harvesting and delivering trees upon a fragile terrain so as to have a dispersed and minimal impact on the terrain, said method comprising:
inserting a plurality of spaced vertical pilings into the terrain so as to protrude above the terrain, said pilings arranged along a predetermined route extending from at least one harvesting site to at least one unloading site;
progressively installing sections of a rail network upon said pilings so as to form a continuous railway having at least two parallel rails supported by said pilings above the terrain over said predetermined route, said installing effected while the weight of said sections is supported by other previously installed sections of said rail network;
cutting said trees adjacent to the surface of said terrain and immediately reducing said trees to bulk-handleable pieces by mobile tree harvesting means while dispersing the weight of said tree harvesting means over a large surface of the terrain;
transporting said bulk-handleable pieces from said tree harvesting means to said rail network by mobile forwarding means while dispersing the weight of said forwarding means over a large surface of the terrain; and
transporting said bulk-handleable pieces received from said forwarding means at said harvesting site to said unloading site by means of a plurality of lorries rollable upon said rail network.

* * * * *